(12) United States Patent
Jang

(10) Patent No.: US 10,662,777 B2
(45) Date of Patent: ***May 26, 2020

(54) STRUCTURE FOR COOLING TURBINE BLADES AND TURBINE AND GAS TURBINE INCLUDING THE SAME

(71) Applicant: DOOSAN HEAVY INDUSTRIES & CONSTRUCTION CO., LTD., Changwon-si, Gyeongsangnam-do (KR)

(72) Inventor: Yun Chang Jang, Gimhae-si (KR)

(73) Assignee: Doosan Heavy Industries Construction Co., Ltd, Gyeongsangnam-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/027,378

(22) Filed: Jul. 5, 2018

(65) Prior Publication Data
US 2019/0078439 A1 Mar. 14, 2019

(30) Foreign Application Priority Data
Sep. 13, 2017 (KR) .................. 10-2017-0117096

(51) Int. Cl.
*F01D 5/30* (2006.01)
*F01D 5/08* (2006.01)
(Continued)

(52) U.S. Cl.
CPC .............. *F01D 5/087* (2013.01); *F01D 5/081* (2013.01); *F01D 5/3015* (2013.01); *F02C 3/04* (2013.01);
(Continued)

(58) Field of Classification Search
CPC ...... F01D 5/3015; F01D 5/3007; F01D 5/326; F01D 5/081; F01D 5/087; F01D 5/088
See application file for complete search history.

(56) References Cited

U.S. PATENT DOCUMENTS 5,951,250 A * 9/1999 Suenaga ................. F01D 5/085
 415/115
6,416,282 B1 * 7/2002 Beeck ..................... F01D 5/087
 415/115
(Continued)

FOREIGN PATENT DOCUMENTS

JP 2008-169838 A 7/2008

*Primary Examiner* — Ninh H. Nguyen
*Assistant Examiner* — Behnoush Haghighian
(74) *Attorney, Agent, or Firm* — Invenstone Patent, LLC

(57) ABSTRACT

A structure for cooling turbine blades, and a turbine and gas turbine including the same, enhance efficiency in cooling turbine blades by improving the structures of a turbine disk and a retainer for securing a turbine blade. The structure includes a turbine blade connected to a turbine blade root; a turbine disk including a slot for receiving the turbine blade root, a cooling passage through which cooling air flows to the turbine blade root, and a branch passage communicating at one end with the cooling passage; and a retainer fixed to the turbine disk on each of opposite sides of the turbine blade to prevent separation of the turbine blade from the turbine disk, the fixed retainer having a chamber communicating with the other end of the branch passage so that the cooling air of the cooling passage is introduced into the chamber through the branch passage.

20 Claims, 8 Drawing Sheets

(51) Int. Cl.
*F02C 3/04* (2006.01)
*F01D 11/00* (2006.01)

(52) U.S. Cl.
CPC ............ *F01D 5/082* (2013.01); *F01D 11/006* (2013.01); *F05D 2220/32* (2013.01); *F05D 2240/81* (2013.01); *F05D 2260/20* (2013.01)

(56) References Cited

U.S. PATENT DOCUMENTS

| | | | | |
|---|---|---|---|---|
| 8,206,119 B2* | 6/2012 | Liotta | ................... | F01D 5/3015 416/220 R |
| 8,616,832 B2* | 12/2013 | Smoke | ................... | F01D 5/087 415/115 |
| 8,696,320 B2* | 4/2014 | Harris, Jr. | ................. | F01D 5/26 416/244 R |
| 8,708,652 B2* | 4/2014 | Caprario | ............... | F01D 5/3015 416/220 R |
| 9,605,552 B2* | 3/2017 | Wondrasek | ........... | F01D 11/006 |
| 10,125,621 B2* | 11/2018 | Barry | ....................... | F01D 5/081 |
| 2005/0232751 A1* | 10/2005 | Townes | ................... | F01D 5/081 415/115 |
| 2008/0181768 A1* | 7/2008 | Brucher | ................ | F01D 5/3015 415/170.1 |
| 2010/0014986 A1* | 1/2010 | Traverso | ................ | F01D 5/081 416/97 R |
| 2012/0107136 A1* | 5/2012 | Buchal | ................... | F01D 5/3015 416/97 R |
| 2012/0180493 A1* | 7/2012 | Snook | ..................... | F01D 5/081 60/772 |
| 2016/0090854 A1* | 3/2016 | Webb | ..................... | F01D 5/081 416/220 R |
| 2016/0146101 A1* | 5/2016 | Lee | ........................... | F02C 3/04 415/68 |
| 2016/0273370 A1* | 9/2016 | Belshaw | ................ | F01D 5/081 |
| 2017/0023018 A1* | 1/2017 | Miller | ..................... | F02C 7/141 |
| 2018/0347472 A1* | 12/2018 | Ortiz | ........................ | F02C 9/18 |

\* cited by examiner

[FIG. 1]
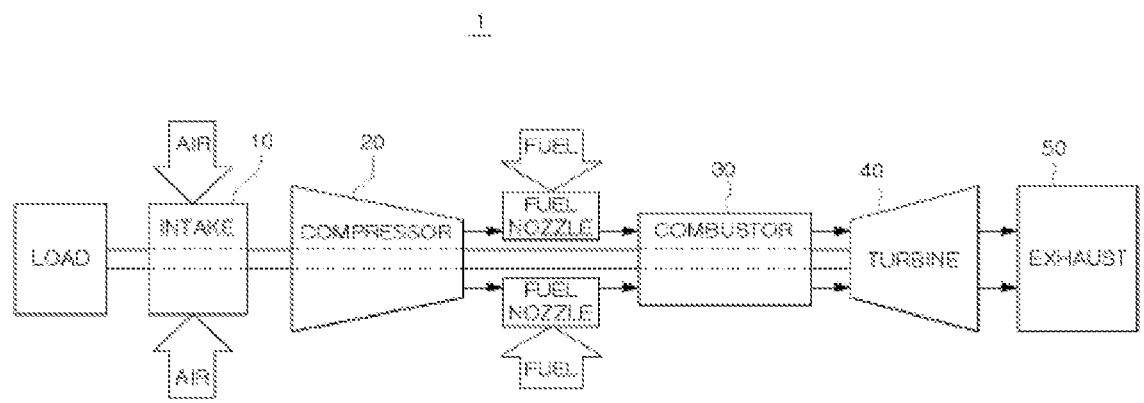
Prior Art

[FIG. 2]
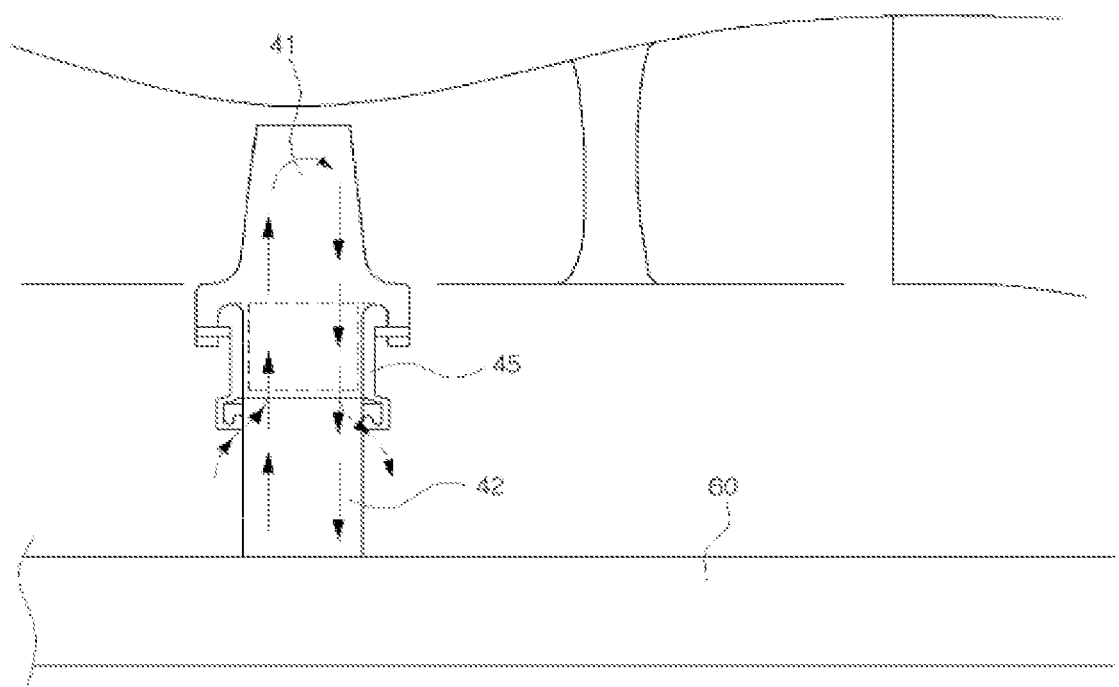
Prior Art

[FIG. 3]
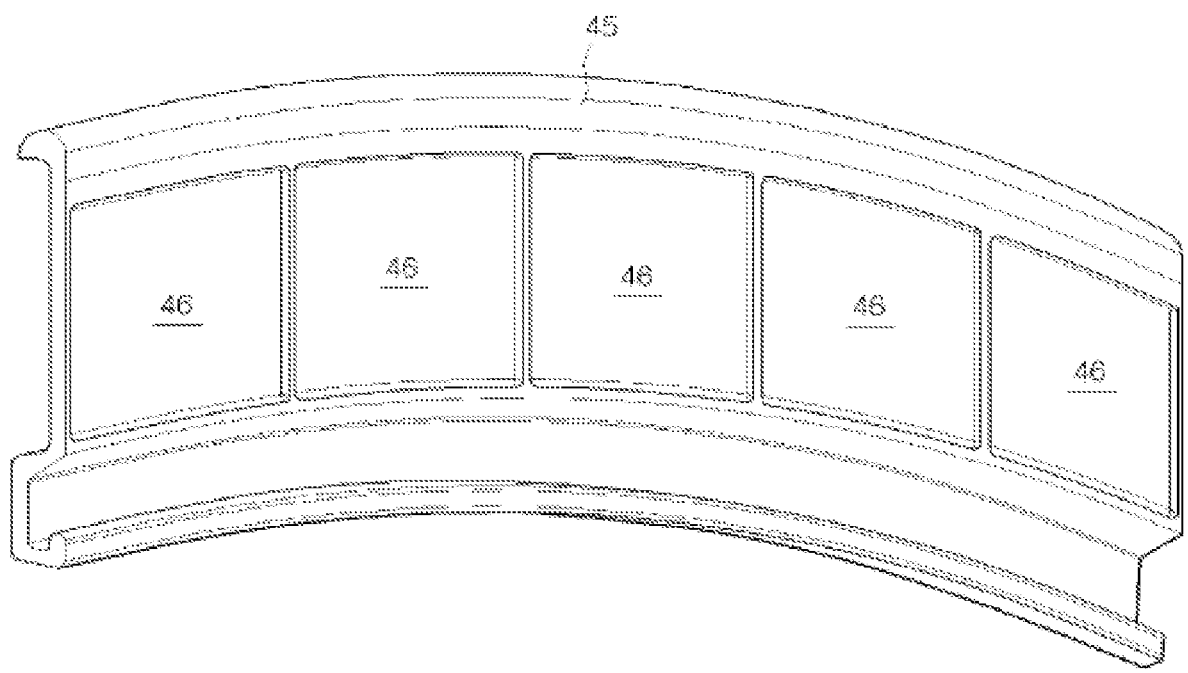
Prior Art

[FIG. 4]
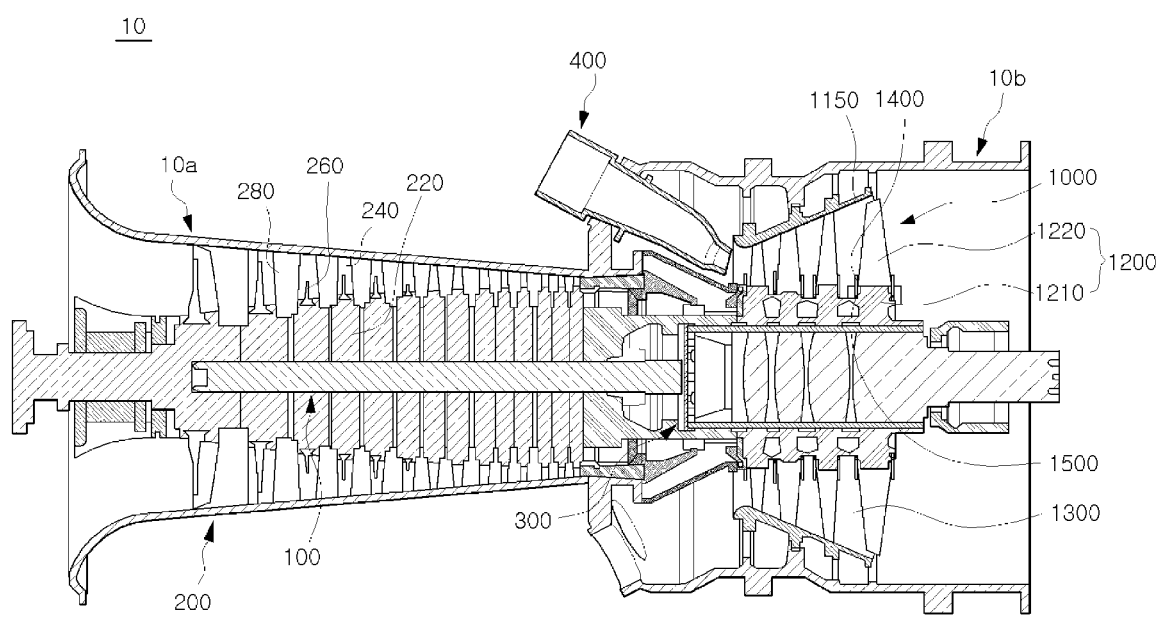

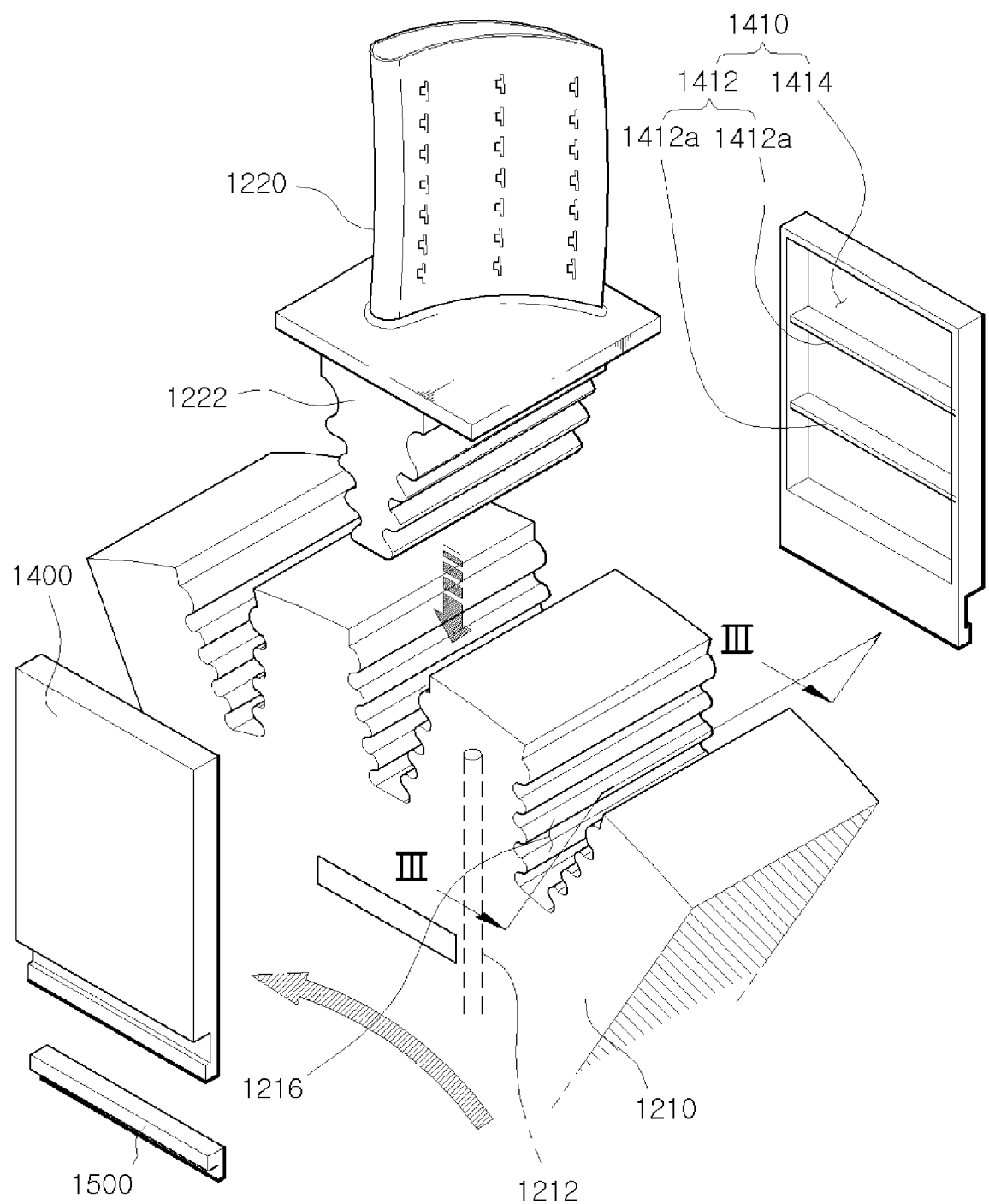
[FIG. 5]

[FIG. 6]
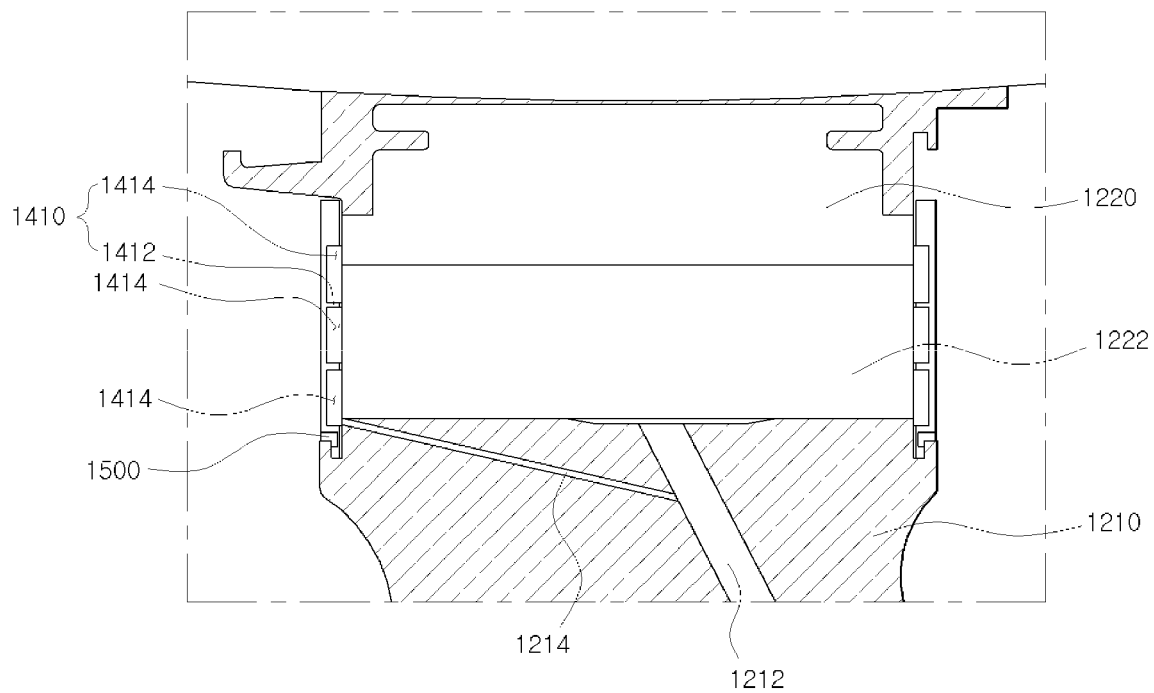

[FIG. 7]
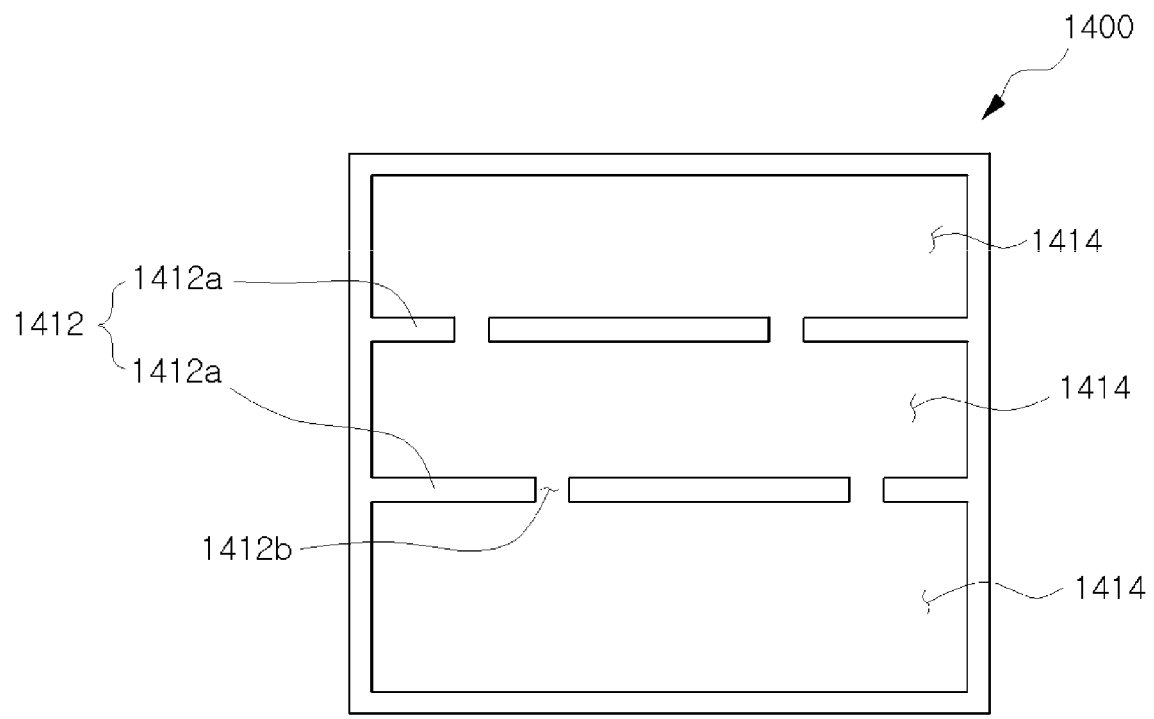

[FIG. 8]
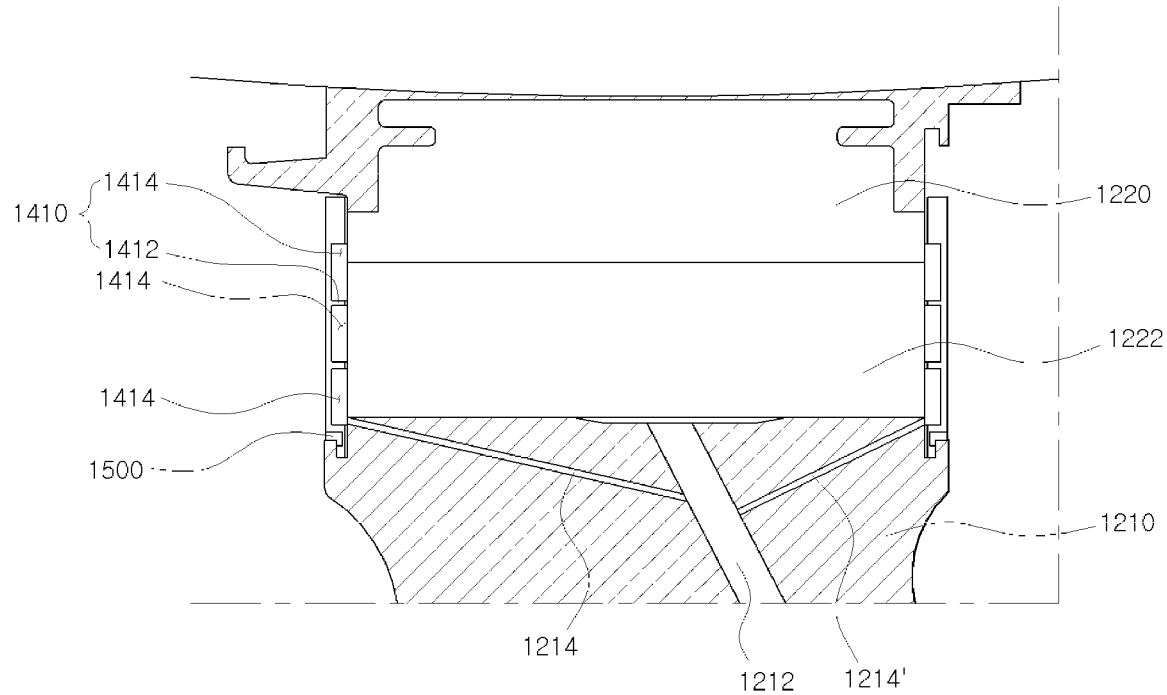

STRUCTURE FOR COOLING TURBINE BLADES AND TURBINE AND GAS TURBINE INCLUDING THE SAME

CROSS-REFERENCE TO RELATED APPLICATIONS

This application claims priority to Korean Patent Application No. 10-2017-0117096, filed on Sep. 13, 2017, the disclosure of which is incorporated herein by reference in its entirety.

BACKGROUND OF THE INVENTION

Field of the Invention

Exemplary embodiments of the present disclosure relate to a structure for cooling turbine blades and a turbine and gas turbine including the same, and more particularly, to a structure for cooling turbine blades of a gas turbine, capable of enhancing efficiency in cooling turbine blades by improving the structures of a turbine disk and a retainer for securing a turbine blade, and to a turbine and gas turbine including the same.

Description of the Related Art

In general, a gas turbine is a type of motor that produces hot combustion gas by burning a mixture of compressed air and fuel and obtains torque by injecting the combustion gas into blades of a turbine.

Referring to FIG. 1, a contemporary gas turbine 1 includes a compressor 20, a combustor 30, and a turbine 40. The compressor 20 is rotated by power generated in the turbine 40 to compress air sucked through an intake 10, and the air compressed by the compressor 20 is mixed with fuel injected from fuel nozzles to be supplied to the combustor 30. The combustor 30 produces hot combustion gas by burning a mixture of compressed air and fuel to supply the combustion gas to the turbine 40 disposed downstream. The turbine 40 generates torque by the supplied combustion gas, and the gas is discharged from the turbine 40 through an exhaust 50 to the outside.

Referring to FIG. 2, the turbine 40 of FIG. 1 includes a rotor 42 having a blade 41 radially coupled to an outer circumference of the rotor 42, around which are arranged retainers 45 disposed on front and rear surfaces of the rotor 42 to prevent a decoupling of the coupled blade 41. The retainers 45, each of which is inserted into a coupling groove of the rotor 42 in the axial direction of a shaft 60, define a space for the introduction of cooling air from outside the rotor 42. Thus, the hot combustion gas supplied to the turbine 40 increases the temperatures of the blade 41 and the centrally disposed rotor 42, thereby suppressing a decrease in life of the blade and the rotor.

Referring to FIG. 3, viewing the retainers 45 from the rear (inner side), one cooling space 46, into which cooling air is introduced, is defined behind each retainer 45. Some of the air compressed in the compressor 20 upstream may be introduced into the cooling space 46 through the rotor 42, and the air introduced into the cooling space 46 serves to prevent overheating of the rotor 42 and the blade 41.

However, in the above gas turbine having the conventional retainer 45, there is only one cooling space defined behind the retainer. This single cooling space permits the cooling air to quickly exit before having a chance to sufficiently cool the coupling portion of the blade and the rotor. The result is a reduction in cooling efficiency of the blade and the rotor.

In addition, the conventional rotor 42 is provided with a passage (not shown) through which compressed air is supplied to one end of the blade 41 fixed to the rotor 42 in order to lower the temperature of the blade 41. However, there is no other such passage for supplying compressed air to any other portion of the blade 41, such that the cooling efficiency of the blade may be reduced.

A technique for cooling the root portion and blade of a conventional gas turbine is disclosed in Japanese Patent Application Publication No. 2013-234659.

SUMMARY OF THE INVENTION

The present disclosure has been made in view of the above-mentioned problems, and an object thereof is to provide a structure for cooling turbine blades, capable of enhancing efficiency in cooling turbine blades by improving structures of an existing turbine disk and retainer to improve a cooling passage in which cooling air flows to a turbine blade, and a turbine and gas turbine including the same.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, a structure for cooling turbine blades may include a turbine blade connected to a turbine blade root; a turbine disk including a slot for receiving the turbine blade root, a cooling passage through which cooling air flows to the turbine blade root, and a branch passage communicating at one end with the cooling passage; and a retainer fixed to the turbine disk on each of opposite sides of the turbine blade to prevent separation of the turbine blade from the turbine disk, the fixed retainer having a chamber communicating with the other end of the branch passage so that the cooling air of the cooling passage is introduced into the chamber through the branch passage.

The cooling air introduced into the chamber may flow between the retainer and the turbine blade and/or between the retainer and the turbine blade root.

The chamber may be divided into a plurality of chamber partitions communicating with each other. At least one chamber partition may face a surface of each of the turbine blade and the turbine blade root, such that the cooling air introduced into the chamber flows between the retainer and the turbine blade root as well as between the retainer and the turbine blade. In addition, at least one chamber partition may communicate with the branch passage.

The structure may further include a plurality of partition walls spaced apart from each other to respectively form the plurality of chamber partitions, wherein the chamber partitions communicate with each other through flow holes formed in the partition walls to allow the cooling air to flow in the chamber partitions. The flow holes may be formed in adjacent partition walls may be misaligned with each other in order to lengthen a path of the flow of the cooling air.

The at least one chamber partition communicating with the branch passage may face a surface of the turbine disk in order to communicate with the branch passage.

The turbine disk may include a second branch passage communicating at one end with the cooling passage and communicating at the other end with a chamber partition facing an opposite surface of the turbine disk in order to communicate with the second branch passage.

The slot may have a fir-tree configuration and extends between opposite sides of the turbine disk, and the retainer fixed to the turbine disk may seal both sides of the slot of the turbine disk.

The structure may further include a fixing member disposed at one side of the retainer to fix the retainer to the turbine disk.

The structure may further include a valve provided in each of the retainers to regulate a flow rate of the cooling air supplied from the branch passage to the chamber; and a controller configured to control an operation of the valve.

In accordance with another aspect of the present disclosure, a turbine, configured to generate power by a passage of combustion gas supplied from a combustor, may include a turbine casing defining a space in which cooling air flows from a compressor; a turbine rotor, installed in the turbine casing, including a plurality of turbine blades each connected to a turbine blade root, and a turbine disk including slots for respectively receiving the turbine blade roots, a cooling passage through which the cooling air flows to the turbine blade root, and a branch passage communicating at one end with the cooling passage; and a retainer fixed to the turbine disk on each of opposite sides of each turbine blade to prevent separation of the turbine blade from the turbine disk, the fixed retainer having a chamber communicating with the other end of the branch passage so that the cooling air of the cooling passage is introduced into the chamber through the branch passage.

In accordance with a further aspect of the present disclosure, a gas turbine may include a compressor configured to compress air supplied from the outside; a combustor configured to produce combustion gas by burning a mixture of fuel and the compressed air; and the above turbine.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a block diagram of a conventional gas turbine;

FIG. 2 is a cross-sectional view of a portion of a conventional turbine;

FIG. 3 is a perspective view of the rear side of the retainers of the turbine of FIG. 2;

FIG. 4 is a schematic cross-sectional view of a gas turbine according to an embodiment of the present disclosure;

FIG. 5 is an exploded perspective view of a turbine blade and a turbine disk according to the embodiment of the present disclosure;

FIG. 6 is a cross-sectional view taken along line III-III of FIG. 5, illustrating a coupling portion of the turbine blade and the turbine disk according to the embodiment of the present disclosure;

FIG. 7 is a plan view of the rear side of a retainer according to the embodiment of the present disclosure; and FIG. 8 is a cross-sectional view taken along line III-III of FIG. 5, illustrating a coupling portion of a turbine blade to a modified turbine disk according to another embodiment of the present disclosure.

DESCRIPTION OF SPECIFIC EMBODIMENTS

Reference will now be made in detail to exemplary embodiments of the present disclosure, examples of which are illustrated in the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

Hereinafter, a structure for cooling turbine blades and a turbine and gas turbine including the same according to exemplary embodiments of the present disclosure will be described with reference to the accompanying drawings.

Referring to FIG. 4, a gas turbine 10 according to the present disclosure includes a tie rod 100, a compressor 200, a torque tube 300, a combustor 400, and a turbine 1000. The tie rod 100 is a rod member installed through the center of the gas turbine 10. The tie rod 100 serves to fasten the compressor 200 and the turbine 1000.

The gas turbine 10 includes a housing 10a and a diffuser 10b disposed behind the housing 10a to discharge combustion gas having passed through the turbine 1000. The combustor 400 is disposed in front of the diffuser 10b to be supplied with compressed air for combustion.

In the flow direction of air, the compressor 200 is disposed upstream of the housing 10a and the turbine 1000 is disposed downstream of the housing 10a. The torque tube 300 as a torque transmission member is preferably disposed between the compressor 200 and the turbine 1000 to transmit a rotational torque generated by the turbine 1000 to the compressor 200.

The compressor 200 includes a plurality of compressor disks 220 (e.g., fourteen disks) fastened by the tie rod 100 so as not to be axially separated from each other. The compressor disks 220 are axially aligned in the state in which the tie rod 100 passes through the substantial centers of the compressor disks 220. The compressor disks 220 are arranged so as not to be rotatable relative to each other in such a manner that the opposing surfaces of adjacent compressor disks 220 are pressed together by the tie rod 100.

Each of the compressor disks 220 has a plurality of compressor blades 240 radially coupled to the outer peripheral surface thereof, and each of the compressor blades 240 has a compressor blade root 260 to be fastened to the compressor disk 220.

Compressor vanes 280 are disposed between each pair of adjacent compressor disks 220 and are fixedly arranged in the housing 10a. The compressor vanes 280 are fixed so as not to rotate, unlike the compressor disk 220, and serve to align the flow of compressed air having passed through the compressor blades 240 of the compressor disk 220 to guide the air to the compressor blades 240 of a compressor disk 220 positioned downstream thereof.

The fastening method of the compressor blade root 260 includes a tangential type and an axial type. These types may be selected according to the required structure of the commercial gas turbine, and may have a dovetail or fir-tree form.

In some cases, the compressor blades may be fastened to the compressor disk using alternative fastening means such as a key or a bolt.

The tie rod 100 is disposed to pass through the centers of the plurality of compressor disks 220. One end of the tie rod 100 is fastened to the farthest upstream compressor disk 220, and the other end is fixed into the torque tube 300.

The combustor 400 mixes the compressed air introduced thereinto with fuel for combustion to produce high-temperature and high-pressure combustion gas with high energy, and increases the temperature of the combustion gas to a temperature at which the combustor and turbine components are able to be resistant to heat in a constant-pressure combustion process.

The constituent combustor of the combustion system of the gas turbine may consist of a plurality of combustors arranged in a cell form in a casing, and includes a burner that has a fuel injection nozzle or the like, a combustor liner that forms a combustion chamber, and a transition piece that is a connection between the combustor and the turbine.

In detail, the liner defines a combustion space in which the fuel injected from the fuel nozzle is mixed with the compressed air from the compressor for combustion. The liner may include a flame container that defines the combustion space, and a flow sleeve surrounding the flame container and defining an annular space. The fuel nozzle is coupled to the front end of the liner, and an ignition plug is coupled to the side wall of the liner.

The transition piece is connected to the rear end of the liner to send the combustion gas burned by the ignition plug to the turbine. The transition piece is configured such that the outer wall thereof is cooled by the compressed air supplied from the compressor so as to prevent damage of the transition piece due to the high temperature of the combustion gas.

To this end, the transition piece has cooling holes formed for injection of air thereinto, and the compressed air is introduced through the holes into the transition piece to cool a main body therein and then flows to the liner.

The cooling air used to cool the transition piece may flow in the annular space of the liner, and may impinge on compressed air as cooling air supplied through cooling hole formed in the flow sleeve from the outside of the flow sleeve in the outer wall of the liner.

The high-temperature and high-pressure combustion gas discharged from the combustor 400 is supplied to the turbine 1000. The supplied high-temperature and high-pressure combustion gas gives impingement or reaction force to the rotor blades of the turbine while expanding to generate a rotational torque. The obtained rotational torque is transmitted via the torque tube 300 to the compressor 200, and power exceeding the power required to drive the compressor is used to drive a generator or the like.

The turbine 1000 has a basic structure similar to that of the compressor 200, and includes a turbine casing 1150, a turbine rotor 1200, a turbine vane 1300, a retainer 1400, and a fixing member 1500.

The turbine casing 1150 has a gas inlet formed at one side thereof and a gas outlet formed at the other side thereof for discharge of gas flowing therein. A plurality of turbine rotors 1200 are arranged in a multi-stage manner in the turbine casing 1150, and the turbine rotors 1200 include a plurality of turbine disks 1210 and a plurality of turbine blades 1220.

Referring to FIG. 5, the plurality of turbine blades 1220 are coupled to the outer surface of each of the plurality of turbine disks 1210, and the turbine disks 1210 are radially arranged on the tie rod 100 to be rotated by the combustion gas supplied from the combustor 400.

The turbine blades 1220, each of which is connected to a turbine blade root 1222, are coupled to each of the turbine disks 1210 in a dovetail manner or the like. A plurality of turbine vanes 1300 fixed into the turbine casing 1150 are arranged in a multi-stage manner between the turbine blades 1220 arranged on the outer peripheral surface of the tie rod 100, and the plurality of turbine vanes 1300 serve to guide the flow of combustion gas having passed through the turbine blades 1220.

Referring to FIG. 6, each of the turbine disks 1210 includes a cooling passage 1212 in which the cooling air supplied from the compressor 200 flows, a branch passage 1214 branched from the cooling passage 1212, and a slot 1216 formed on the circumferential surface thereof for mounting of the turbine blade root 1222 so that each of the turbine blades 1220 is coupled to the turbine disk 1210 through the slot 1216.

The plurality of turbine vanes 1300 are arranged in a multi-stage manner in the circumferential direction of the turbine casing 1150, and are preferably formed to be sequentially alternated with the turbine blades 1220 in the axial direction of the tie rod 100.

Retainers 1400 are disposed at both sides of each turbine blade 1220 mounted to the slot 1216, and preferably disposed at both sides of the turbine blade root 1222. The retainers 1400 serve to prevent separation of the turbine blade 1220 mounted to the slot 1216.

Preferably, the turbine blade root 1222 has a fir-tree configuration, and the slot 1216 has a corresponding configuration, which extends between opposite sides of the turbine disk 1210. Since the retainers 1400 are disposed at both sides of the turbine blade root 1222, both sides of the slot 1216 is sealed by the retainers 1400 and a leakage of cooling air is prevented while the turbine blade root 1222 is cooled by the cooling air flowing in the cooling passage 1212 communicating with the slot 1216, thereby enhancing cooling efficiency.

The turbine disk 1210 preferably has a mounting groove for mounting of each of the retainers 1400, and the retainer 1400 mounted to the mounting groove is fixed by a fixing member 1500. The retainer 1400 is fixed to one surface of the turbine disk 1210 by inserting the fixing member 1500 into the mounting groove, thereby sealing one side of the slot 1216.

The retainer 1400 has a chamber 1410 that communicates with the branch passage 1214 formed in the turbine disk 1210, with the consequence that the cooling air supplied from the compressor 200 is introduced into the chamber 1410. That is, at least one chamber partition 1410 communicates with the branch passage 1214 and faces a surface of the turbine disk 1210 in order to communicate with the branch passage 1214. Thus, the retainer 1400 cools the turbine blade 1220 using the cooling air introduced into the chamber 1410.

Specifically, the cooling air introduced into the chamber 1410 flows between the retainer 1400 and the turbine blade 1220 and also flows between the retainer 1400 and the turbine blade root 1222. Thus, when the chamber 1410 is divided into chamber partitions (described below) communicating with each other, at least one chamber partition faces a surface of each of the turbine blade 1220 and the turbine blade root 1222, such that the cooling air introduced into the chamber 1410 flows between the retainer 1400 and the turbine blade root 1222 as well as between the retainer 1400 and the turbine blade 1220.

Referring to FIGS. 6 and 7, the chamber 1410 is divided into a plurality of chamber partitions 1414 by a partition wall part 1412, and the partition wall part 1412 dividing the chamber 1410 into the chamber partitions 1414 consists of a plurality of partition walls 1412a. The plurality of partition walls 1412a have flow holes 1412b through which the cooling air introduced into the chamber 1410 flows. Preferably, a flow hole 1412b formed in one of the partition walls 1412a is misaligned with a flow hole 1412b formed in an adjacent partition wall 1412a. Cooling air flows slowly in the chamber partitions 1414 by the misalignment of the flow holes 1412b, thereby increasing cooling efficiency. In other words, the flow holes 1412b formed in adjacent partition walls are misaligned with each other, to increase cooling efficiency by lengthening a path of the flow of the cooling air.

Referring to FIG. 8, a turbine disk 1210 may have a second branch passage 1214' formed corresponding to the branch passage 1214 of the previous embodiment. The second branch passage 1214' communicates with a retainer 1400 disposed at a position corresponding to the retainer 1400 communicating with the branch passage 1214 so that the cooling air supplied from the compressor 200 flows to a chamber 1410 of the retainer 1400. The retainer 1400 cools the turbine blade 1220 using the cooling air introduced into the chamber 1410.

The branch passage 1214 and the second branch passage 1214' communicate with the chamber partitions 1414 positioned adjacent to the turbine disk 1210. The cooling air introduced into the lower chamber partition 1414 cools the turbine blade root 1222 pressed against the chamber 1410 while sequentially flowing to the upper chamber partition 1414 through the flow holes 1412b.

Although it is described that the chamber 1410 is divided into three chamber partitions 1414 by the partition walls 1412 with reference to FIGS. 5 to 8, the present disclosure is not limited thereto. The number of chamber partitions 1414 may be increased to enhance cooling efficiency by cooling air.

The retainer 1400 has a valve (not shown) that regulates a flow rate of cooling air flowing to the chamber 1410 through the branch passage 1214. The operation of the valve is preferably controlled by a controller (not shown). The turbine blade 1220 has a temperature sensor for measuring the temperature thereof. Thus, based on the temperature measured by the temperature sensor, the controller controls the valve to regulate the flow rate of cooling air flowing to the chamber 1410 and cool the turbine blade 1220.

The turbine disk 1210 is a rotor that rotates along with the rotation of the turbine blades 1220 by combustion gas, and the turbine vanes 1300 are fixed to the turbine casing 1150 and are stators fixed irrespective of the rotation of the turbine blades 1220. The combustion gas pushes the turbine blades 1220 while passing through the turbine blades 1220. When the combustion gas pushes the turbine blades 1220, the turbine blades 1220 and the turbine disk 1210 rotate about the tie rod 100, and the flow of the combustion gas having passed through the turbine blades 1220 is guided by the turbine vanes 1300 so that the combustion gas is discharged to the outside through the diffuser 10b.

It is possible to enhance the efficiency in cooling turbine blades by improving the structure of the turbine disk 1210 and the structure of the retainer 1400 for supporting the turbine blade 1220. In addition, since the plurality of divided chamber partitions 1414 as cooling spaces are radially formed in the rear of the retainer 1400 so that cooling air flows radially outward of the turbine blade root 1222 in sequence to cool the turbine blade 1220, it is possible to enhance the durability of the turbine blade 1220.

As is apparent from the above description, the structure for cooling turbine blades and the turbine and gas turbine including the same according to the exemplary embodiments of the present disclosure can enhance the efficiency in cooling turbine blades by improving the structure of the turbine disk and the structure of the retainer for supporting the turbine blade. In addition, since a plurality of divided cooling spaces are radially defined in the rear of the retainer so that cooling air flows radially outward of the turbine blade root in sequence to cool the turbine blade, it is possible to enhance the durability of the turbine blade.

While the present disclosure has been described with respect to the embodiments illustrated in the drawings, this is merely for illustrative purposes. It will be understood by those skilled in the art that various modifications and other equivalent embodiments may be made without departing from the spirit and scope of the disclosure as defined in the following claims. Therefore, the true technical protection scope of the present disclosure should be defined by technical concepts of the appended claims.

What is claimed is:

1. A structure for cooling turbine blades, comprising:
a plurality of turbine blades each connected to a turbine blade root;
a turbine disk including slots respectively receiving the turbine blade roots, a cooling passage through which cooling air flows downstream to the turbine blade root, and a branch passage having first and second ends formed at opposite extremes of the branch passage, the first end communicating with the cooling passage; and
a retainer fixed to the turbine disk on each of opposite sides of each turbine blade to prevent separation of the turbine blade from the turbine disk, the retainer having a chamber communicating with the second end of the branch passage so that the cooling air of the cooling passage is introduced into the chamber through the branch passage,
wherein the cooling passage extends in a radial direction and includes a cooling portion disposed between an adjacent pair of the slots, and
wherein the first and second ends of the branch passage are formed inside the turbine disk and are disposed closer to a center axis of the turbine disk than the turbine blade roots, the first end disposed closer to the center axis than the second end such that the first end and the cooling passage form an angle disposed upstream of the cooling portion of the cooling passage.

2. The structure according to claim 1, wherein the cooling air introduced into the chamber flows between the retainer and the turbine blade.

3. The structure according to claim 1, wherein the cooling air introduced into the chamber flows between the retainer and the turbine blade root.

4. The structure according to claim 1, wherein the chamber is divided into a plurality of chamber partitions communicating with each other, at least one chamber partition communicating with the branch passage.

5. The structure according to claim 4, further comprising:
a plurality of partition walls spaced apart from each other to respectively form the plurality of chamber partitions,
wherein the chamber partitions communicate with each other through flow holes formed in the partition walls to allow the cooling air to flow in the chamber partitions.

6. The structure according to claim 5, wherein the flow holes formed in adjacent partition walls are misaligned with each other in order to lengthen a path of the flow of the cooling air.

7. The structure according to claim 5, wherein the plurality of chamber partitions each have a radial width that is less than a circumferential length, and the flow holes formed in any one of the partition walls occupy less of the circumferential length than a portion of the partition wall in which no flow holes are formed.

8. The structure according to claim 5, wherein the plurality of chamber partitions each have a pair of radially extending sides and a pair of circumferentially extending sides, and each partition wall of the plurality of partition walls is connected to the pair of radially extending sides.

9. The structure according to claim 4, wherein the at least one chamber partition communicating with the branch passage faces a surface of the turbine disk in order to communicate with the branch passage.

10. The structure according to claim 9, wherein the turbine disk includes a second branch passage communicating at one end with the cooling passage and communicating at the other end with a chamber partition facing an opposite surface of the turbine disk in order to communicate with the second branch passage.

11. The structure according to claim 4, wherein the plurality of chamber partitions each have a radial width that is less than a circumferential length, and the plurality of chamber partitions are disposed such that the circumferential length is arranged in a direction perpendicular to the radial direction.

12. The structure according to claim 1, wherein:
the slot has a fir-tree configuration and extends between opposite sides of the turbine disk; and
the retainer fixed to the turbine disk seals both sides of the slot of the turbine disk.

13. The structure according to claim 1, further comprising:
a fixing member that is disposed at one side of the retainer and includes a body and a flange extending from the body in a radial direction of the turbine disk to fix the retainer to the turbine disk.

14. The structure according to claim 13, further comprising:
a mounting groove formed in an exposed outer surface of the turbine disk,
wherein the mounting groove includes a recess extending in the radial direction of the turbine disk, and the recess is configured to receive a radial insertion of the flange of the retainer.

15. The structure according to claim 14, wherein the retainer fixed to the turbine disk includes a turbine blade side disposed toward the turbine blade and a turbine disk side disposed toward the turbine disk, and the recess of the mounting groove is further configured to receive a radial insertion of the turbine disk side of the retainer together with the flange of the retainer.

16. The structure according to claim 13, wherein the flange includes a first flat surface facing in an axial direction of the turbine disk.

17. The structure according to claim 16, wherein the flange includes a second flat surface opposite to the first flat surface, the second flat surface facing in the axial direction of the turbine disk.

18. The structure according to claim 1, wherein the angle is an acute angle formed by the branch passage and the cooling portion of the cooling passage.

19. A turbine configured to generate power by a passage of combustion gas supplied from a combustor, the turbine comprising:
a turbine casing defining a space in which cooling air flows from a compressor;
a turbine rotor that is installed in the turbine casing and comprises:
a plurality of turbine blades each connected to a turbine blade root, and
a turbine disk including slots for respectively receiving the turbine blade roots, a cooling passage through which the cooling air flows downstream to the turbine blade root, and a branch passage having first and second ends formed at opposite extremes of the branch passage, the first end communicating with the cooling passage; and
a retainer fixed to the turbine disk on each of opposite sides of each turbine blade to prevent separation of the turbine blade from the turbine disk, the retainer having a chamber communicating with the second end of the branch passage so that the cooling air of the cooling passage is introduced into the chamber through the branch passage,
wherein the cooling passage extends in a radial direction and includes a cooling portion disposed between an adjacent pair of the slots, and
wherein the first and second ends of the branch passage are formed inside the turbine disk and are disposed closer to a center axis of the turbine disk than the turbine blade roots, the first end disposed closer to the center axis than the second end such that the first end and the cooling passage form an angle disposed upstream of the cooling portion of the cooling passage.

20. A gas turbine comprising:
a compressor configured to compress air supplied from the outside;
a combustor configured to produce combustion gas by burning a mixture of fuel and the compressed air; and
a turbine configured to generate power by a passage of the combustion gas, the turbine comprising:
a turbine casing defining a space in which cooling air flows from a compressor;
a turbine rotor that is installed in the turbine casing and comprises:
a plurality of turbine blades each connected to a turbine blade root, and
a turbine disk including slots for respectively receiving the turbine blade roots, a cooling passage through which the cooling air flows downstream to the turbine blade root, and a branch passage having first and second ends formed at opposite extremes of the branch passage, the first end communicating with the cooling passage; and
a retainer fixed to the turbine disk on each of opposite sides of each turbine blade to prevent separation of the turbine blade from the turbine disk, the retainer having a chamber communicating with the second end of the branch passage so that the cooling air of the cooling passage is introduced into the chamber through the branch passage,
wherein the cooling passage extends in a radial direction and includes a cooling portion disposed between an adjacent pair of the slots, and
wherein the first and second ends of the branch passage are formed inside the turbine disk and are disposed closer to a center axis of the turbine disk than the turbine blade roots, the first end disposed closer to the center axis than the second end such that the first end and the cooling passage form an angle disposed upstream of the cooling portion of the cooling passage.

\* \* \* \* \*